(12) United States Patent
Kim (10) Patent No.: US 8,322,478 B2
(45) Date of Patent: Dec. 4, 2012

(54) HANDS-FREE ELECTRIC SCOOTER (75) Inventor: Joon Hyung Kim, Seoul (KR)

(73) Assignee: Robo3 Co., Ltd., Seoul (KR)

( * ) Notice: Subject to any disclaimer, the term of this patent is extended or adjusted under 35 U.S.C. 154(b) by 116 days.

(21) Appl. No.: 13/077,221

(22) Filed: Mar. 31, 2011

(65) Prior Publication Data

US 2011/0303475 A1   Dec. 15, 2011

(30) Foreign Application Priority Data

Jun. 14, 2010   (KR) .................. 10-2010-0055778

(51) Int. Cl.
B62D 61/00   (2006.01)
(52) U.S. Cl. ......................................... 180/218; 180/7.1
(58) Field of Classification Search .................. 180/218, 180/7.1
See application file for complete search history.

(56) References Cited

U.S. PATENT DOCUMENTS

| | | | |
|---|---|---|---|
| 6,866,107 B2* | 3/2005 | Heinzmann et al. | 180/7.1 |
| 7,703,568 B2* | 4/2010 | Ishii | 180/218 |
| 7,783,392 B2* | 8/2010 | Oikawa | 701/1 |
| 7,866,429 B2* | 1/2011 | Ishii et al. | 180/218 |
| 2008/0245594 A1* | 10/2008 | Ishii et al. | 180/218 |
| 2009/0078485 A1* | 3/2009 | Gutsch et al. | 180/218 |
| 2010/0017090 A1* | 1/2010 | Doi | 701/91 |
| 2010/0057319 A1* | 3/2010 | Inaji et al. | 701/70 |
| 2010/0071984 A1* | 3/2010 | Doi et al. | 180/218 |
| 2010/0121538 A1* | 5/2010 | Ishii et al. | 701/48 |

* cited by examiner

Primary Examiner — Tashiana Adams
Assistant Examiner — Michael Stabley
(74) Attorney, Agent, or Firm — Saliwanchik, Lloyd & Eisenschenk (57) ABSTRACT The present invention relates to a hands-free electric scooter including: a bottom housing; a steering housing disposed on the bottom housing; a steering shaft having a pressurizing plate mounted along the lower periphery thereof, a horizontal protrusion formed on one side of the pressurizing plate, a manipulating rod mounted on the underside of the horizontal protrusion, and a stopper mounted along the intermediate periphery thereof; a steering jig having an insertion hole formed at one side thereof, a micro switch mounted at the rear side of the insertion hole and having a grounding stick disposed at one side thereof, and an installation hole formed at the front side of the insertion hole; and a potential meter adapted to control direction changes of the hands-free electric scooter.

2 Claims, 7 Drawing Sheets

HANDS-FREE ELECTRIC SCOOTER

CROSS-REFERENCE TO RELATED APPLICATION

This application claims the benefit under 35 U.S.C. §119 of Korean Patent Application No. 10-2010-0055778, filed Jun. 14, 2010, which is hereby incorporated by reference in its entirety.

BACKGROUND OF THE INVENTION

1. Field of the Invention

The present invention relates to an electric scooter, and more particularly, to a hands-free electric scooter that does not need the use of a rider's hands at the time of manipulating forward and backward movements and left and right direction changes during riding.

2. Background of the Related Art

Figure 1:
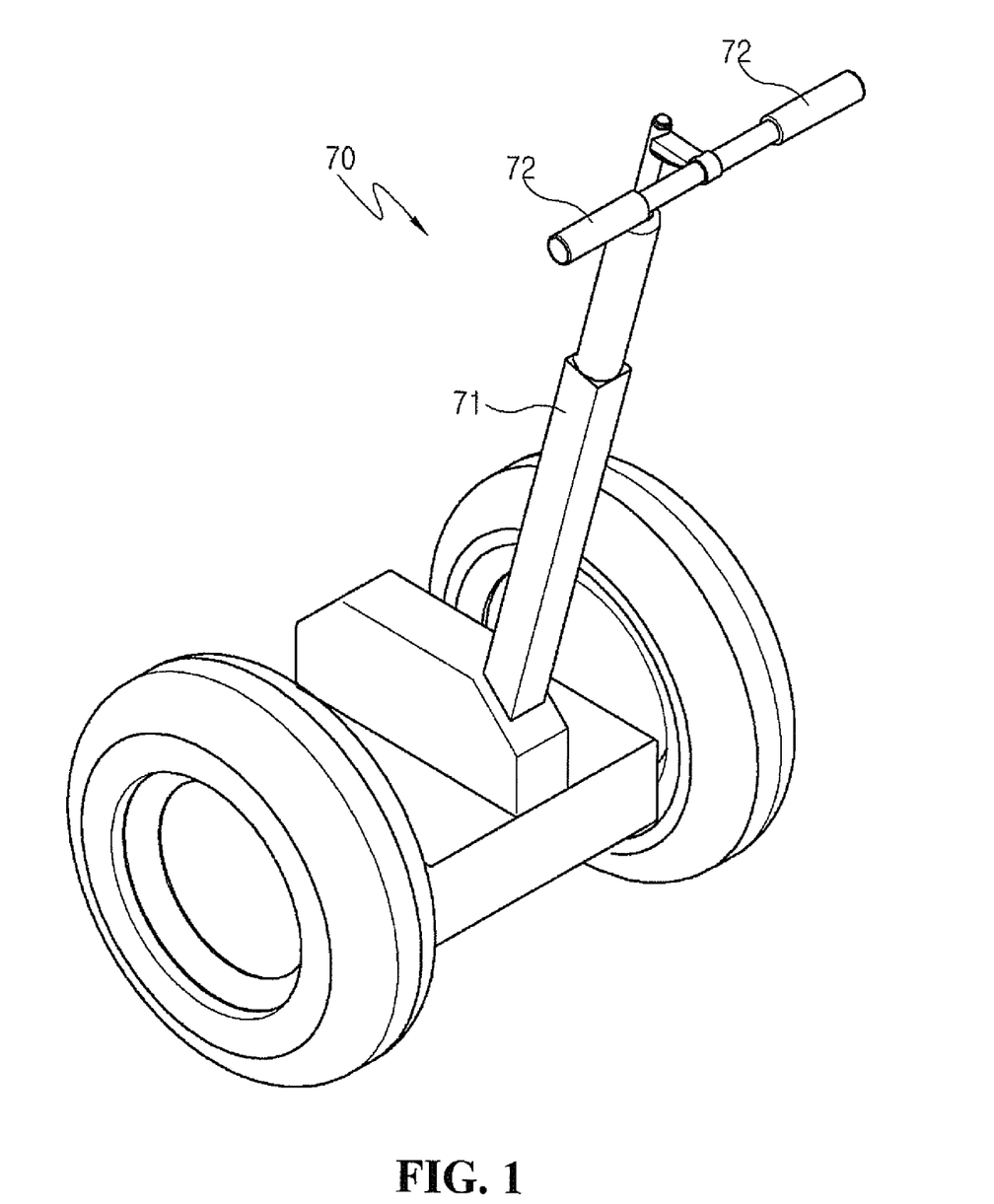
FIG. 1 is a perspective view showing a conventional stand-up riding electric scooter.

FIG. 1 is a perspective view showing a conventional stand-up riding electric scooter. As shown in FIG. 1, a stand-up riding electric scooter 70 is ridden while maintaining the balance between two wheels in real time. So as to maintain the balance of the two wheels, that is, while a variety of electrical processors inclusive of a gyroscope sensor are being controlled through a controller, the balance of the two wheels is maintained in real time, thereby making it possible to perform forward and backward movements and left and right direction changes of the electric scooter 70.

For example, as shown in FIG. 1, in a state where a rider stands up on the stand-up riding electric scooter 70 if he holds manipulating hands 72 and inclines his body forwardly by a given angle, the variety of sensors inclusive of the gyroscope sensor sense the inclination, and the wheels of the electric scooter are driven in a direction of the inclination, such that the inclination is removed and the electric scooter does not fall down forwardly by the generation of the inclination, thereby correcting the position of the electric scooter and providing safe riding.

Therefore, while the rider is maintaining his body balance and the stand-up position through the two wheels, the forward and backward movements can be achieved in accordance with the direction of his body inclination, and the left and right direction changes can be achieved by pulling the left and right manipulating handles 72.

In the configuration of the conventional stand-up riding electric scooter 70 wherein the rider should ride the electric scooter 70 in the state of holding the manipulating handles 72 in the stand-up position, however, there occurs a serious problem that the hands of the rider are not free during the riding. On the other hand, as shown in FIG. 1, because of a structural problem caused by a fixing shaft 71 erectly mounted on the stand-up riding electric scooter 70 in such a manner as to be disposed together with the manipulating handles 72, the whole size of the electric scooter becomes increased, so that the electric scooter 70 is not put in a car trunk.

Because of the center of gravity focused just on the fixing shaft 71 and the manipulating handles 72, in addition, the conventional stand-up riding electric scooter 70 falls to the ground if the supply of power stops, and therefore, so as to prevent the falling of the electric scooter 70, the supply of power to the electric scooter 70 should be kept even while the electric scooter 70 is being parked.

BRIEF SUMMARY

Accordingly, the present invention has been made in view of the above-mentioned problems occurring in the prior art, and it is an object of the present invention to provide a hands-free electric scooter that does not have any existing manipulating handles and fixing shaft, thereby allowing a rider's hands to be free during riding.

It is another object of the present invention to provide a hands-free electric scooter that performs forward and backward movements in a state where a rider sits in a seat and bends his body and performs left and right direction changes in a state where he sits in the seat and turns his body to left and right sides, such that his hands can be free during riding, and even though the rider has a disorder in his hands, he can easily ride the electric scooter.

To accomplish the above objects, according to the present invention, there is provided a hands-free electric scooter having a bottom housing into which a controller on which a variety of sensors inclusive of a gyroscope sensor are arranged, batteries, and motors are housed, and a pair of wheels mounted on both sides of the bottom housing, thereby sensing an inclined angle of a rider's body and performing riding according to the sensed result, the hands-free electric scooter including: a steering housing disposed on the bottom housing; a steering shaft insertedly disposed at the interior of the steering housing in such a manner as to have a seat mounted along the top portion thereof and to be assembled to a steering jig along the lower portion thereof, the steering shaft having a pressurizing plate mounted along the lower periphery thereof, a horizontal protrusion formed on one side of the pressurizing plate, a manipulating rod mounted on the underside of the horizontal protrusion, and a stopper mounted along the intermediate periphery thereof so as to prevent the steering shaft from being escaped from the steering housing; the steering jig having an insertion hole formed at one side thereof so as to insert the steering shaft thereinto, a micro switch mounted at the rear side of the insertion hole so as to control the drive of the motors and having a grounding stick disposed at one side thereof, and an installation hole formed at the front side of the insertion hole so as to mount a potential meter therealong; and the potential meter adapted to control direction changes of the hands-free electric scooter and having a manipulating plate mounted along the top periphery thereof, the manipulating plate having an elongated hole formed at one side thereof, wherein if the steering shaft is insertedly fitted to the insertion hole of the steering jig, the pressurizing plate serves to pressurize the grounding stick of the micro switch, thereby allowing the manipulating rod to be inserted into the elongated hole of the manipulating plate.

According to the present invention, desirably, a first spring is interposed between the horizontal protrusion formed on one side of the pressurizing plate and an upward protrusion formed at the front side of the installation hole of the steering jig, and a second spring is interposed between the horizontal protrusion formed on one side of the pressurizing plate and a mounting hole formed on the top portion of the steering housing.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

As appreciated from the title of the invention, a main feature of the present invention is placed on the electric scooter that does not make use of a rider's hands so as to perform forward and backward movements and left and right direction changes during riding, thereby ensuring that the rider's hands are free during the riding.

Hereinafter, an explanation on a hands-free electric scooter according to the present invention will be in detail given with reference to the attached drawings.

Figure 2:
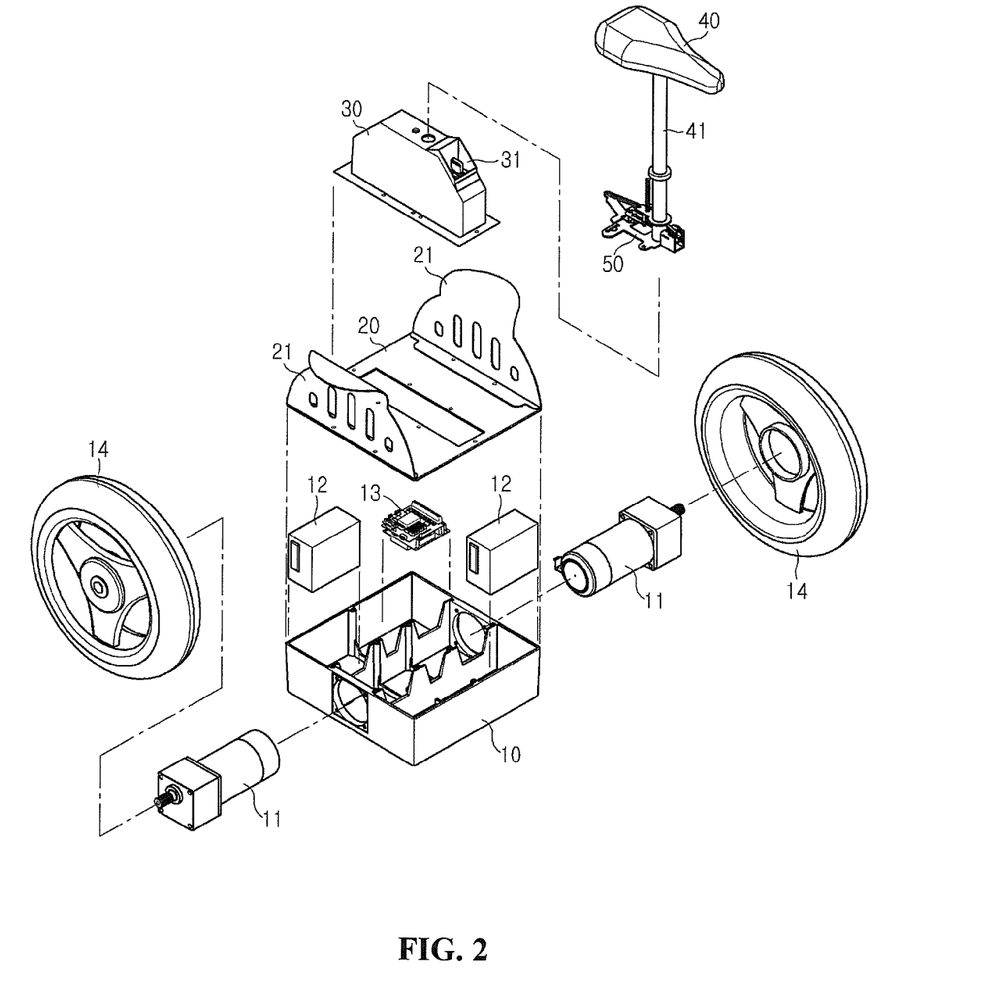
FIG. 2 is a separate perspective view showing a hands-free electric scooter according to the present invention.
Figure 3:
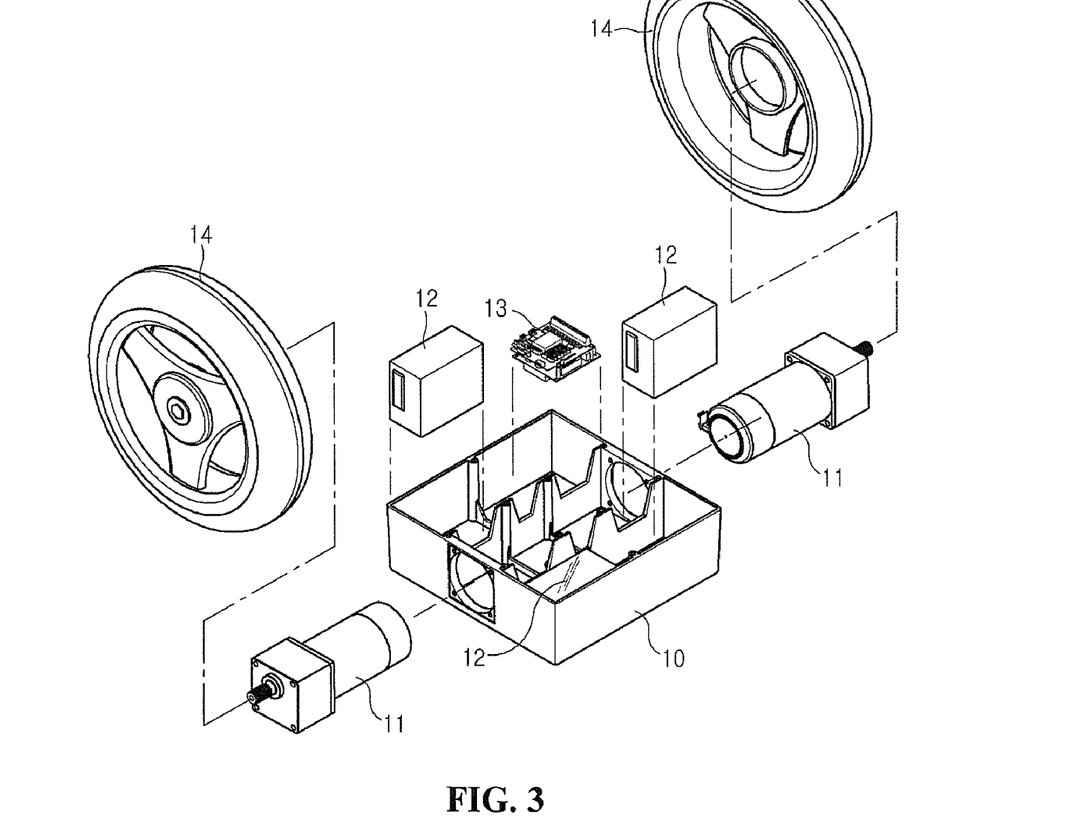
FIG. 3 is a separate perspective view showing the assembled state of a bottom housing in the hands-free electric scooter according to the present invention.

FIG. 2 is a separate perspective view showing a hands-free electric scooter according to the present invention, and FIG. 3 is a separate perspective view showing the assembled state of a bottom housing in the hands-free electric scooter according to the present invention. As shown in FIGS. 2 and 3, a bottom housing 10 is disposed at the lower portion of the hands-free electric scooter, and batteries 12 for supplying power are mounted inside the bottom housing 10. On the other hand, two motors 11 are mounted on both sides of the bottom housing 10 so as to receive the power supplied from the batteries 12 and to drive two wheels 14, and the two wheels 14 are mounted at the outside of the bottom housing 10 and are rotated by means of the drive of the motors 11. Also, a controller 13 on which a variety of sensors inclusive of a gyroscope sensor are arranged is mounted inside the bottom housing 10 so as to control the riding and direction changes of the electric scooter.

Figure 4:
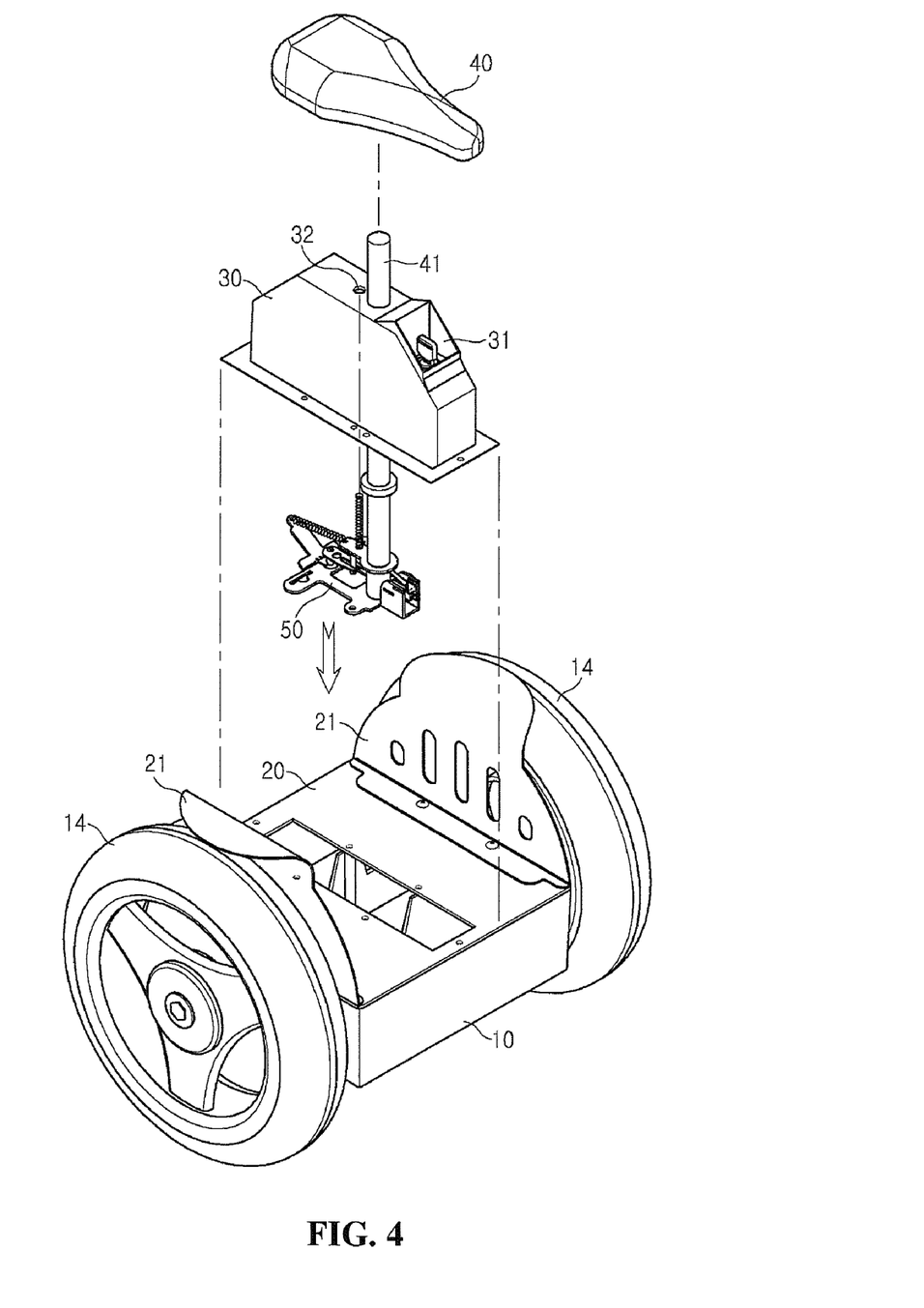
FIG. 4 is a separate perspective view showing the assembled state of a steering housing in the hands-free electric scooter according to the present invention.

FIG. 4 is a separate perspective view showing the assembled state of a steering housing in the hands-free electric scooter according to the present invention. As shown in FIG. 4, a foot board 20 on which a rider stands up is disposed on the top surface of the bottom housing 10, and guide plates 21 are disposed on both sides of the upper portion of the foot board 20 so as to protect the rider from the rotating wheels 14. On the other hand, a steering housing 30 into which a steering jig 50 is mounted is disposed on the top portion of the foot board 20, as shown in FIG. 4. A key box 31 is provided on the steering housing 30.

Figure 5:
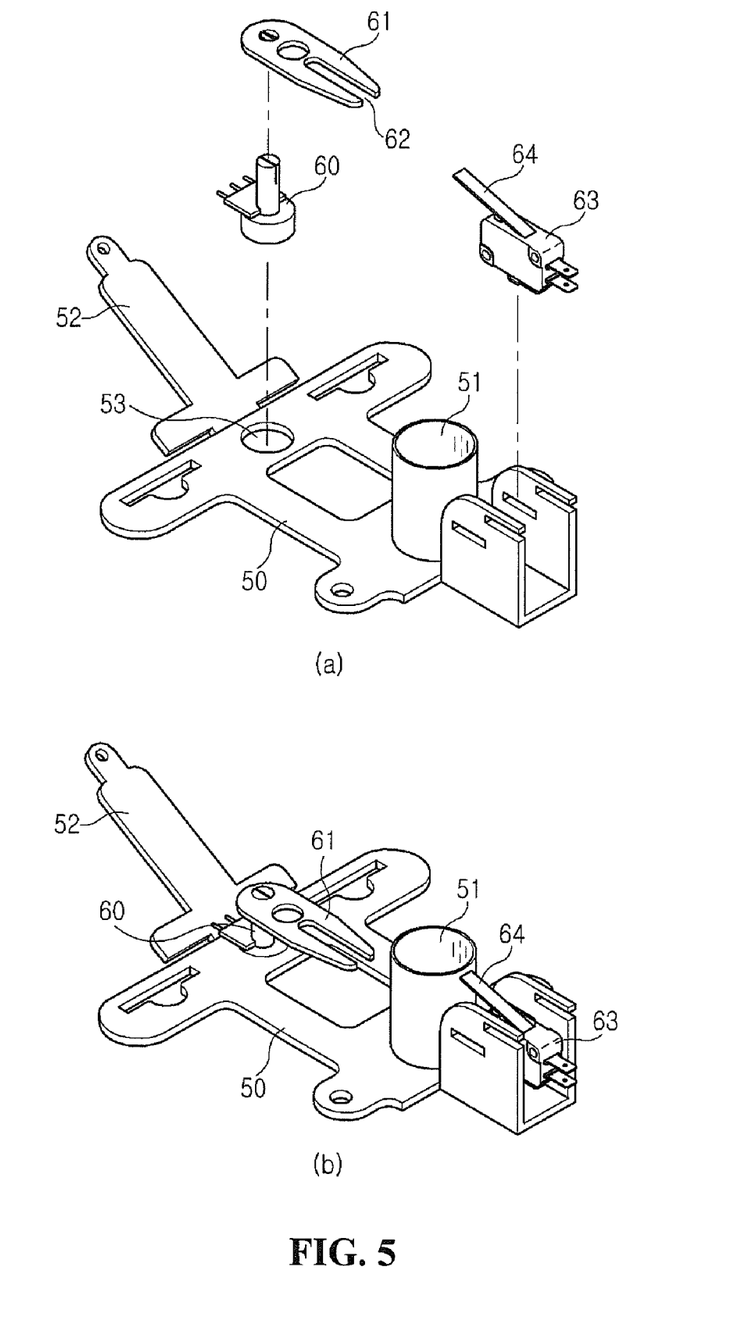
FIGS. 5a and 5b are separate perspective views showing the assembled state of a steering jig in the hands-free electric scooter according to the present invention.
Figure 6:
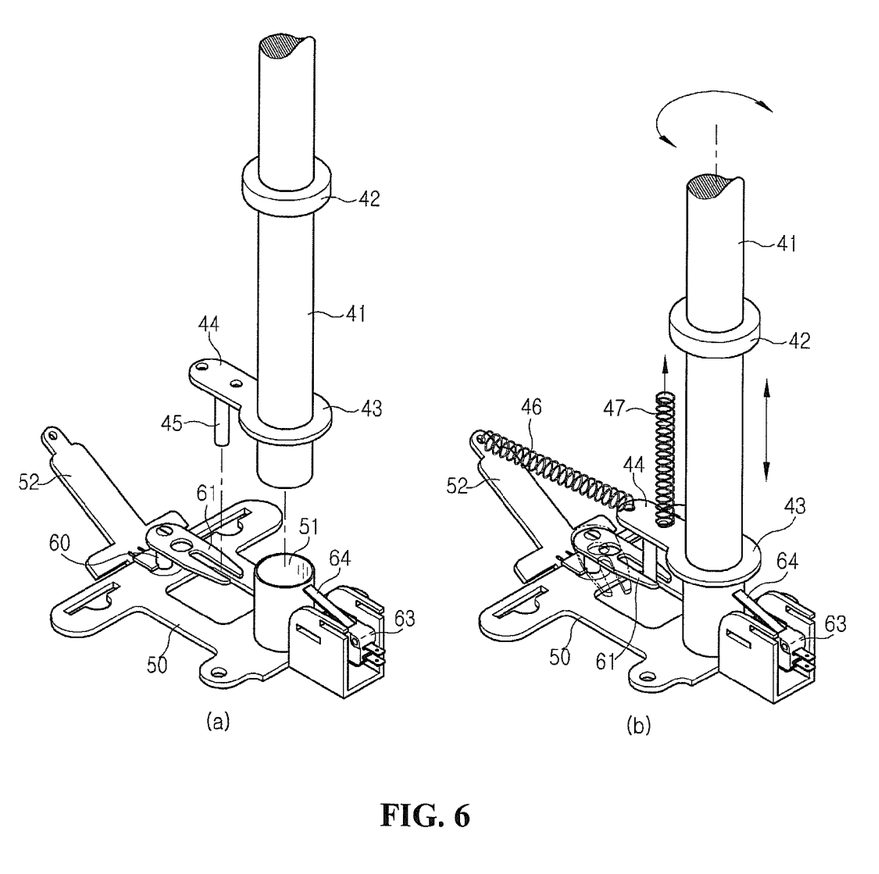
FIGS. 6a and 6b are separate perspective views showing the assembled state of the steering jig and the steering shaft in the hands-free electric scooter according to the present invention.

FIGS. 5a and 5b are separate perspective views showing the assembled state of the steering jig in the hands-free electric scooter according to the present invention, and FIGS. 6a and 6b are separate perspective views showing the assembled state of the steering jig and the steering shaft in the hands-free electric scooter according to the present invention. FIGS. 5a to 6b show the features of the configuration of the hands-free electric scooter according to the present invention, and under this substantial configuration, the rider's hands can be free during the riding.

FIG. 5a shows a detailed configuration of the steering jig 50. The steering jig 50 is disposed inside the steering housing 30, as shown in FIG. 4 and has an insertion hole 51 formed at one side thereof so as to insert a steering shaft 41 thereinto. On the other hand, a seat 40 is mounted along the top portion of the steering shaft 41, in which the rider sits.

Also, a micro switch 63 is mounted at the rear side of the insertion hole 51 so as to control the drive of the motors 11, and a potential meter 60 is fitted along an installation hole 53 formed at the front side of the insertion hole 51 so as to control the direction changes of the hands-free electric scooter according to the present invention. The potential meter 60 is a rotary type potential meter that detects a rotation angle during riding by utilizing a resistance, and so as to operate the potential meter 60, a manipulating plate 61 is mounted on the top portion of the potential meter 60.

FIGS. 6a and 6b are separate perspective views showing the assembled state of the steering jig and the steering shaft in the hands-free electric scooter according to the present invention. As shown in FIG. 6a, a pressurizing plate 43 is mounted along the lower periphery of the steering shaft 41 so as to pressurize a grounding stick 64 of the micro switch 63, and a horizontal protrusion 44 is formed on one side of the pressurizing plate 43 so as to mount first and second springs 46 and 47 and a manipulating rod 45 thereon. The manipulating rod 45 is mounted on the underside of the horizontal protrusion 44, and as shown in FIG. 6a, it is fitted to the interior of an elongated hole 62 formed on the manipulating plate 61.

On the other hand, a stopper 42 is mounted along the intermediate periphery of the steering shaft 41 so as to prevent the steering shaft 41 from being escaped from the steering housing 30 when the steering shaft 41 pulls upwardly.

As shown in FIG. 6a, the steering shaft 41 is rotatably inserted into the insertion hole 51, and at the same time, the manipulating rod 45 is fitted to the elongated hole 62 of the manipulating plate 61 mounted on the potential meter 60. Also, the pressurizing plate 43 mounted along the steering shaft 41 is positioned above the micro switch 63 so as to press the grounding stick 64 of the micro switch 63, as shown in FIG. 6b.

On the other hand, as shown in FIG. 6b, the first spring 46 is interposed between the horizontal protrusion 44 formed on one side of the pressurizing plate 43 and an upward protrusion 52 formed at the front side of the installation hole 53, and the second spring 47 is interposed between the horizontal protrusion 44 formed on one side of the pressurizing plate 43 and a mounting hole 32 formed on the top portion of the steering housing 30. Now, the functions of the detailed configurations of the steering jig 50 and the steering shaft 41 will be explained through the operating procedure of the hands-free electric scooter according to the present invention.

Figure 7:
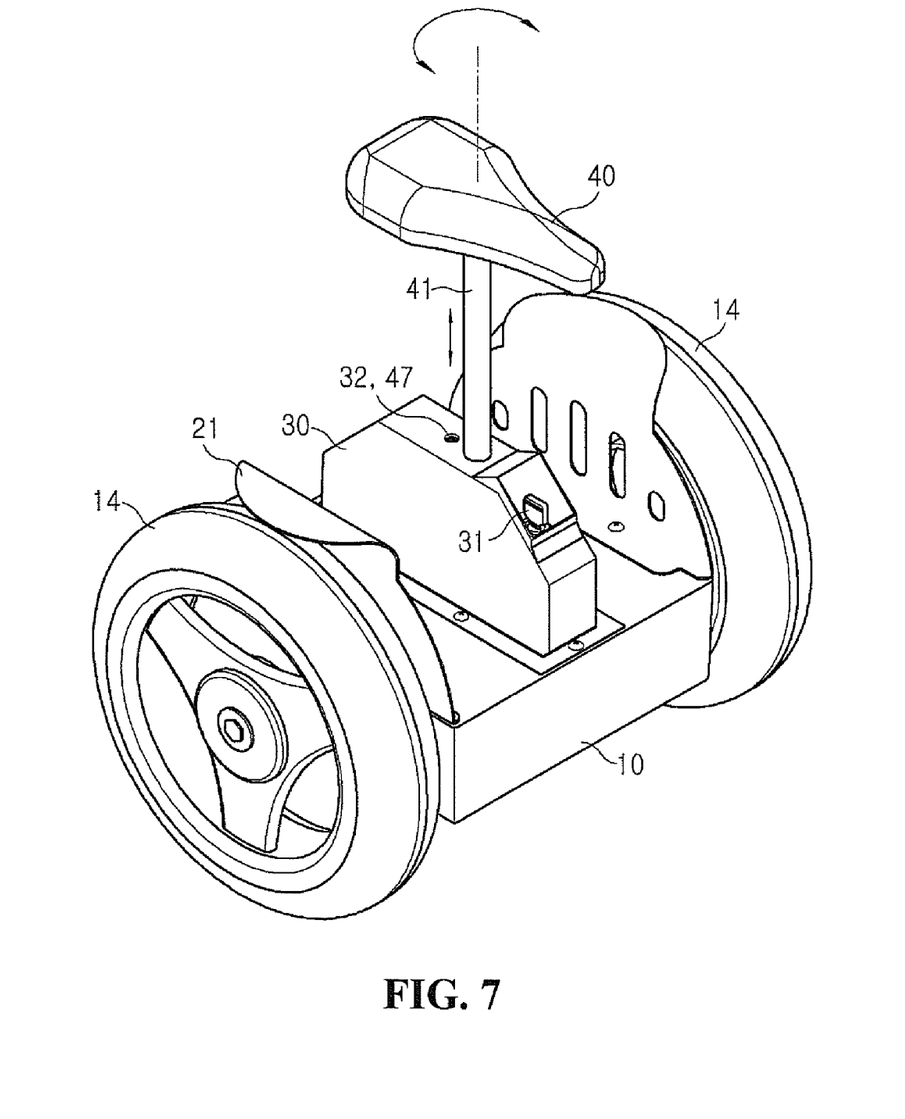
FIG. 7 is a perspective view showing the assembled state of the hands-free electric scooter according to the present invention.

FIG. 7 is a perspective view showing the assembled state of the hands-free electric scooter according to the present invention, and in a state where the hands-free electric scooter according to the present invention is assembled as shown in FIG. 7, if a key is inserted into the key box 31 and is then turned, the batteries 12 are activated and an initial state for riding starts.

At this time, if the rider sits in the seat 40, the steering shaft 41 is moved downwardly by the load of the rider, as shown in FIG. 6b. This is because the steering shaft 41 can be contracted and extended upwardly and downwardly by means of the second spring 47 interposed between the pressurizing plate 43 and the mounting hole 32 formed on the top portion of the steering housing 30.

As mentioned above, if the steering shaft 41 is moved downwardly, the underside of the pressurizing plate 43 mounted along the lower periphery of the steering shaft 41 pressurizes the grounding stick 64 of the micro switch 63, as appreciated from FIG. 6b. This state is the drive preparation state for the motors 11. That is, the motors 11 are driven if the rider's body bends in the state where the grounding stick 64 of the micro switch 63 is pressed.

For example, in the state where the rider sits in the seat 40, if his body is inclined to a predetermined angle, the variety of sensors inclusive of the gyroscope sensor sense the inclination, and the motors 11 are rotated to a degree removing the inclination, such that the wheels 14 are driven in the direction of the inclination and the position of the hands-free scooter is corrected to provide safe riding.

On the other hand, if the rider gets off the electric scooter because of arriving at a destination or the irregular road surface, the motors 11 are returned to a state of being impossible to rotate, which is because the second spring 47 is elastically returned by means of the rider's getting off to cause the pressurizing plate 43 and the grounding stick 64 of the micro switch 63 to be spaced apart from each other. According to the present invention, therefore, only if the rider gets off the electric scooter, the motors 11 are not driven, thereby previously preventing unexpected safety accidents caused by the continuous driving of the motors 11 from occurring.

According to the present invention, also, the direction changes of the electric scooter can be carried out by rotating the seat 40. For example, if the rider twists his body at the waist during riding, the steering shaft 41 is rotated, as appreciated from FIG. 6, and further, the manipulating rod 45 mounted on the lower periphery of the steering shaft 41 is rotated. At this time, the manipulating plate 61 is rotated together with the manipulating rod 45, and thus, the potential meter 60 is rotated. As a result, the rotation of the seat 40 allows the potential meter 60 to be rotated.

The potential meter 60 is a rotary type potential meter which detects a rotation angle of riding by utilizing a resistance, and the detected rotation angle from the potential meter 60 is sent to the controller 13, such that the hands-free electric scooter according to the present invention performs the direction changes by means of the signal generated from the controller 13. After the direction change through the twisting of the seat 40 is performed, the seat 40 is maintained at a position on which the rider always can look forward by means of the elastic force of the first spring 46 interposed between the upward protrusion 52 of the steering jig 50 and the horizontal protrusion 44 formed on the pressurizing plate 43.

As described above, there is provided the hands-free electric scooter that does not need to make use of the rider's hands for manipulation during riding, thereby permitting the rider's hands to be completely free during the riding, so that he can do something like taking a picture with a camera. Also, even though the rider has a disorder in his hands, he can easily ride the electric scooter just by twisting his body at the waist and bending his body in a state of sitting in the seat.

Further, since the hands-free electric scooter according to the present invention does not need the parts like the fixing shaft and the manipulating handles disposed on the conventional stand-up riding electric scooter, advantageously, the hands-free electric scooter can be put in a car trunk. In addition, since the center of gravity of the hands-free electric scooter according to the present invention is placed on the bottom housing, the hands-free electric scooter can maintain the center of gravity thereof like a tumbling doll even while it is not being ridden, such that there is no need for activation of the batteries to maintain the center of gravity of the electric scooter while the electric scooter is not being ridden.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A hands-free electric scooter having a bottom housing (10) into which a controller (13) on which a variety of sensors inclusive of a gyroscope sensor are arranged, batteries (12), and motors (11) are housed, and a pair of wheels (14) mounted on both sides of the bottom housing (10), thereby sensing an inclined angle of a rider's body and performing riding according to the sensed result, the hands-free electric scooter comprising: a steering housing (30) disposed on the bottom housing (10); a steering shaft (41) insertedly disposed at the interior of the steering housing (30) in such a manner as to have a seat (40) mounted along the top portion thereof and to be assembled to a steering jig (50) along the lower portion thereof, the steering shaft (41) having a pressurizing plate (43) mounted along the lower periphery thereof, a horizontal protrusion (44) formed on one side of the pressurizing plate (43), a manipulating rod (45) mounted on the underside of the horizontal protrusion (44), and a stopper (42) mounted along the intermediate periphery thereof so as to prevent the steering shaft (41) from being escaped from the steering housing (30); the steering jig (50) having an insertion hole (51) formed at one side thereof so as to insert the steering shaft (41) thereinto, a micro switch (63) mounted at the rear side of the insertion hole (51) so as to control the drive of the motors (11) and having a grounding stick (64) disposed at one side thereof, and an installation hole (53) formed at the front side of the insertion hole (51) so as to mount a potential meter (60) therealong; and the potential meter (60) adapted to control direction changes of the hands-free electric scooter and having a manipulating plate (61) mounted along the top periphery thereof, the manipulating plate (61) having an elongated hole (62) formed at one side thereof, wherein if the steering shaft (41) is insertedly fitted to the insertion hole (51) of the steering jig (50), the pressurizing plate (43) serves to pressurize the grounding stick (64) of the micro switch (63), thereby allowing the manipulating rod (45) to be inserted into the elongated hole (62) of the manipulating plate (61).

2. The hands-free electric scooter according to claim 1, wherein between the horizontal protrusion (44) formed on one side of the pressurizing plate (43) and an upward protrusion (52) formed at the front side of the installation hole (53) of the steering jig (50) is interposed a first spring (46), and between the horizontal protrusion (44) formed on one side of the pressurizing plate (43) and a mounting hole (32) formed on the top portion of the steering housing (30) is interposed a second spring (47).

* * * * *